United States Patent
Leimbach et al.

(10) Patent No.: US 11,334,293 B1
(45) Date of Patent: May 17, 2022

(54) FACILITATING THE IMPLEMENTATION OF CLUSTER COUNTERS ON LOCK VALUE BLOCKS IN DISTRIBUTED FILE SYSTEMS

(71) Applicant: EMC IP Holding Company LLC, Hopkinton, MA (US)

(72) Inventors: David Leimbach, Lynwood, WA (US); Douglas Kilpatrick, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 17/160,545

(22) Filed: Jan. 28, 2021

(51) Int. Cl.
*G06F 3/06* (2006.01)
*G06F 16/176* (2019.01)
*G06F 8/41* (2018.01)

(52) U.S. Cl.
CPC .......... *G06F 3/0659* (2013.01); *G06F 3/0604* (2013.01); *G06F 3/067* (2013.01); *G06F 3/0614* (2013.01); *G06F 3/0622* (2013.01); *G06F 3/0635* (2013.01); *G06F 8/458* (2013.01); *G06F 16/1774* (2019.01)

(58) Field of Classification Search
CPC .... G06F 3/0659; G06F 3/0604; G06F 3/0614; G06F 3/0622; G06F 3/0635; G06F 3/067; G06F 8/458; G06F 16/176–1774; G06F 16/2336–2343; G06F 2201/825
See application file for complete search history.

(56) References Cited

U.S. PATENT DOCUMENTS

| | | | | |
|---|---|---|---|---|
| 8,868,755 B2* | 10/2014 | Attaluri | ................... | G06F 9/526 710/200 |
| 8,949,623 B2* | 2/2015 | Becq | .................... | H04N 7/1675 713/193 |
| 10,776,285 B2* | 9/2020 | Chen | .................... | G06F 12/1466 |
| 2006/0101081 A1* | 5/2006 | Lin | ...................... | G06F 16/2343 |
| 2008/0086470 A1* | 4/2008 | Graefe | ................ | G06F 16/2343 |
| 2008/0294648 A1* | 11/2008 | Lin | ...................... | G06F 16/2343 |
| 2009/0119304 A1* | 5/2009 | Preslan | ............... | H04L 67/1031 |
| 2010/0205387 A1* | 8/2010 | Sun | ...................... | G06F 9/30116 711/E12.001 |
| 2012/0158683 A1* | 6/2012 | Whitehouse | ........ | G06F 16/1774 707/704 |
| 2018/0096036 A1* | 4/2018 | Haldenby | ............ | G06Q 10/105 |
| 2019/0139588 A1* | 5/2019 | Kim | .................... | G06F 12/0246 |
| 2020/0117651 A1* | 4/2020 | Puchin | .................... | G06F 16/25 |
| 2020/0311292 A1* | 10/2020 | Haldenby | ............. | G06F 3/0482 |

* cited by examiner

*Primary Examiner* — Nicholas J Simonetti
(74) *Attorney, Agent, or Firm* — Amin, Turocy & Watson, LLP

(57) ABSTRACT

Facilitating the implementation of cluster counters on lock value blocks in distributed file systems is provided herein. A system comprises a processor and a memory that stores executable instructions that, when executed by the processor, facilitate performance of operations. The operations comprise receiving, from a first node device of a group of node devices, first information indicative of a first lock value block status of an object, and, from a second node device of the group of node devices, second information indicative of a second lock value block status of the object. The operations also can comprise merging the first information and the second information, resulting in a status of a lock value block of the object implemented at respective node devices of the group of node devices.

20 Claims, 10 Drawing Sheets

FACILITATING THE IMPLEMENTATION OF CLUSTER COUNTERS ON LOCK VALUE BLOCKS IN DISTRIBUTED FILE SYSTEMS

TECHNICAL FIELD

The subject disclosure relates generally to distributed file systems. More specifically, the subject disclosure relates to managing lock resources in distributed file systems.

BACKGROUND

Distributed storage systems and/or object storage systems can provide a wide range of storage services while achieving high scalability, availability, and serviceability. Operations of distributed storage systems and/or object storage systems can include a locking mechanism to maintain data consistency of the associated shared files. For example, shared and exclusive acquisition of a lock, where there can be multiple shared owners simultaneously, can be utilized as a pattern for the locking mechanism. However, this pattern can be costly for a distributed system with thousands of shared lockers, as a single thread taking an exclusive lock anywhere in the system can bring all shared lock requests to a halt until all existing shared owners release their locks.

The above-described context with respect to conventional storage systems is merely intended to provide an overview of current technology and is not intended to be exhaustive. Other contextual description, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a system that comprises a processor and a memory that stores executable instructions that, when executed by the processor, facilitate performance of operations. The operations can comprise receiving, from a first node device of a group of node devices, first information indicative of a first lock value block status of an object, and, from a second node device of the group of node devices, second information indicative of a second lock value block status of the object. The operations also can comprise merging the first information and the second information, resulting in a status of a lock value block of the object implemented at respective node devices of the group of node devices.

In an implementation, the operations also can comprise, prior to the receiving of the first information and the second information, transmitting a release revocation message to the group of node devices. The release revocation message can comprise an instruction to release the lock value block. Further to this implementation, the operations can comprise, in response to the release revocation message, receiving, from the first node device, the first information and a first lock release indication. Further, the operations can comprise receiving, from the second node device, the second information and a second lock release indication.

According to some implementations, the first information comprises a first increment value of the lock value block and a first decrement value of the lock value block determined by the first node device. Further to these implementations, the second information comprises a second increment value of the lock value block and a second decrement value of the lock value block determined by the second node device.

Further to the above implementations, the merging can comprise determining a first difference between the first increment value and the first decrement value, resulting in a first difference value. The merging also can comprise determining a second difference between the second increment value and the second decrement value, resulting in a second difference value. Additionally, the merging can comprise deriving the status of the lock value block of the object based on a summation of the first difference value and the second difference value.

The lock value block implemented at the respective node devices of the group of node devices can be associated with pending computing processes executing on the group of node devices according to some implementations. Thus, the operations comprise comparing the status of the lock value block with a threshold status level. Based on the status of the lock value block satisfying the threshold status level, the operations can comprise temporarily halting the pending computing processes executing on a third node device of the group of node devices. Additionally or alternatively, based on the status of the lock value block failing to satisfy the threshold status level, the operations can comprise approving the pending computing processes executing on the third node device.

A first thread of the first node device and a second thread of the second node device obtain respective locks for the object simultaneously or substantially simultaneously. Further, ownership of a lock is retained at a node level. The first thread and the second thread do not have the ownership of the lock. In an example, the object is a file stored on a distributed file system. In another example, nodes of a distributed file system comprise the group of node devices.

Another embodiment relates to a method that can comprise determining, by a system comprising a processor, a first value of a lock associated with an object based on first information received from a first node of a cluster of nodes. The method also can comprise determining, by the system, a second value of the lock associated with the object based on second information received from a second node of the cluster of nodes. Further, the method can comprise merging, by the system, the first value and the second value, resulting in a combined value of the lock, wherein the first node updates the first value and the second node updates the second value independently. The merging can comprise supporting concurrent updates to the first value and the second value at the first node and the second node. In some implementations, merging of the first value and the second value can be performed by a lock coordinator node of the cluster of nodes. The object can be a file stored on a distributed file system. The nodes of the cluster of nodes can be part of a distributed file system.

According to some implementations, the method can comprise determining, by the system, a third value of the lock associated with the object based on third information received from a third node of the cluster of nodes. The method also can comprise merging, by the system, the third value with the combined value of the lock, resulting in an updated combined value. The third node updates the first value independently of the first node and the second node. The merging of the third value can comprise supporting concurrent updates to the first value, the second value, and the third value.

According to some implementations, the first information comprises a first increment value and a first decrement value. Further, determining of the first value can comprise reducing the first increment value by the first decrement value. The second information can comprise a second increment value and a second decrement value. The determining of the second value can comprise reducing the second increment value by the second decrement value. Additionally, the merging can comprise determining a summation of the first value and the second value.

Prior to the determining of the first value, according to some implementations, the method can comprise transmitting a release revocation message to the cluster of nodes. The release revocation message can comprise an instruction to release respective lock value blocks associated with the object at respective node devices of the cluster of nodes.

Another embodiment relates to a non-transitory machine-readable medium, comprising executable instructions that, when executed by a processor, facilitate performance of operations. The operations can comprise sending, to node devices of a set of node devices, a revocation request that instructs the node devices to release locks held by the node devices for an object. Sending the revocation request can be in response to a request for an exclusive lock for the object received from a first node device of the node devices. The operations also can comprise receiving, from a second node device of the node devices, first information indicative of a first lock value determined for the object at the second node device, and, from a third node device of the node devices, second information indicative of a second lock value determined for the object at the third node device. The first lock value and the second lock value can be determined individually by the second node device and the third node device, respectively. The operations also can comprise determining a current value of a lock value block for the object based on merging the first information and the second information. Further, the operations can comprise providing the exclusive lock for the object to the first node device, wherein the exclusive lock comprises the current value of the lock value block for the object.

In some implementations, the first information comprises a first increment value of the object and a first decrement value of the object. Further, the second information comprises a second increment value of the object and a second decrement value of the object.

Determining of the current value can comprise, according to some implementations, determining a first status value based on subtracting the first decrement value from the first increment value and determining a second status value based on subtracting the second decrement value from the second increment value. Further, determination of the current value can comprise determining an aggregation of the first status value and the second status value, resulting in the current value of the lock value block for the object.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Example embodiments are directed to a scalable solution for gathering statistics in a clustered computer system by updating values associated with a lock where many concurrent updates to the same value can be supported at substantially the same time. Accordingly, local counter value updates can be performed inexpensively while deferring the cost of gathering the consistent value "on demand" by taking the more exclusive lock. One example computing platform that can optionally incorporate the local lock techniques disclosed herein is an ISILON OneFS® cluster provided by DELL®, Inc. It can be appreciated that OneFS® clusters are one of many optional cluster computing technologies, any of which can incorporate the teachings of this disclosure.

Figure 1:
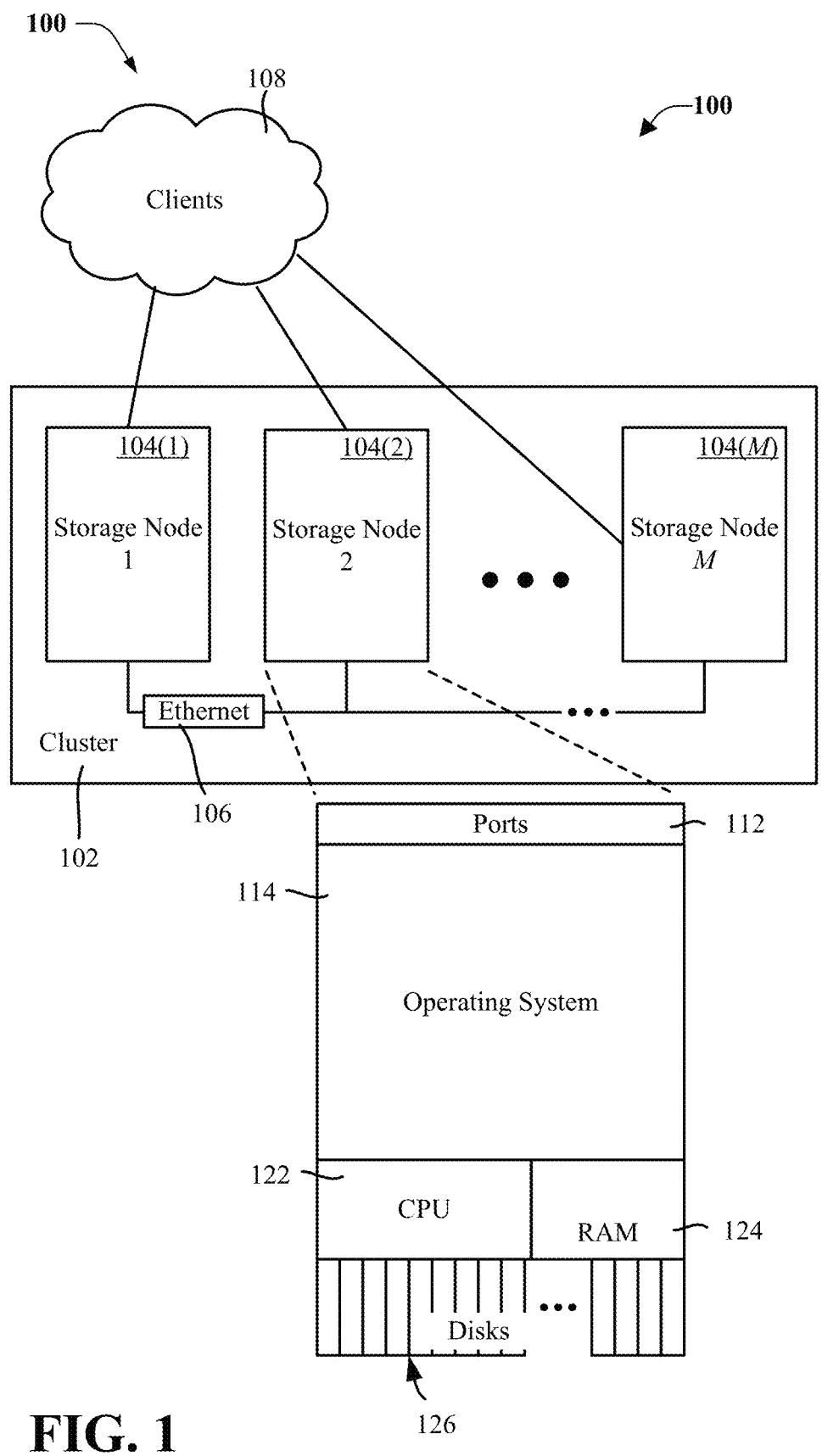
FIG. 1 illustrates an example cluster of computing devices, in accordance with one or more embodiments described herein.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

In a non-limiting example, OneFS® implements a two-tiered distributed locking system, referred to as "lk." The two-tiered distributed locking system means that locks for a resource are coordinated by a given node, referred to as a coordinator, which can be petitioned for locks by nodes, referred to as initiators, on behalf of threads on the initiator nodes. Thus, when a thread requires a lock to perform work on a resource, that request might need to not only go to it local initiator, but also be sent off-node to the cluster-wide coordinator for that resource before a lock can be granted and the thread can be unblocked.

Gathering statistics in a clustered computer system should have an efficient manner to update values from each computer (e.g., node or node device). The statistics gathering should also have a procedure to periodically check the actual values (e.g., confirmed values). A conventional approach to solving the problem uses full exclusivity for both reading and updating such values. Using the conventional approach does not work well at scale since each node would have to stop the progress of other nodes use of the counter system for each read and write, which introduces latency. Another conventional approach is to use a shared and/or exclusive locking mechanism whereby shared lockers can read the value, but exclusivity is needed to update the value. This approach is okay as long as each value is only ever updated by one node at a time, which is not always practicable. Accordingly, the disclosed aspects provide a scalable solution, whereby many concurrent (or substantially concurrent) updates to the same value can be support at a same time (or substantially the same time).

Lock Value Blocks (LVBs) are a technology built into the OneFS® lock system that allows for a lock owner to also own the current value of some additional data carried with the lock. A thread running on a given node in the cluster can take a lock, update the value, and release the lock. Subsequent lockers receive the new value.

With the disclosed embodiments, which are enhancements to the LVB system, there can be a more compatible lock type. According to this lock type, individual threads across different nodes can take a lock simultaneously, or substantially at a same time, update their local values, and eventually merge the value back to a lock coordinator rather than copying over the prior value. The embodiments of the lock system discussed herein provides for a lazy unlock operation. In this lazy unlock operation, ownership of the lock is retained at the node level, but not at the thread level of a given node. This allows outstanding updates to remain local to the node until the updated values are needed.

In order to gather the outstanding values at each node, another less-compatible (more exclusive) lock type can be acquired by a given thread. This forces the lazily unlocked values to be gathered first at the lock coordinator. At the lock coordinator, the values can be merged (e.g., via a sum operation) and then relayed back to the new lock owner.

Accordingly, the various embodiments provided herein can facilitate local counter updates inexpensively while deferring the cost of gathering the consistent value "on demand" by taking the more exclusive lock.

Figure 2:
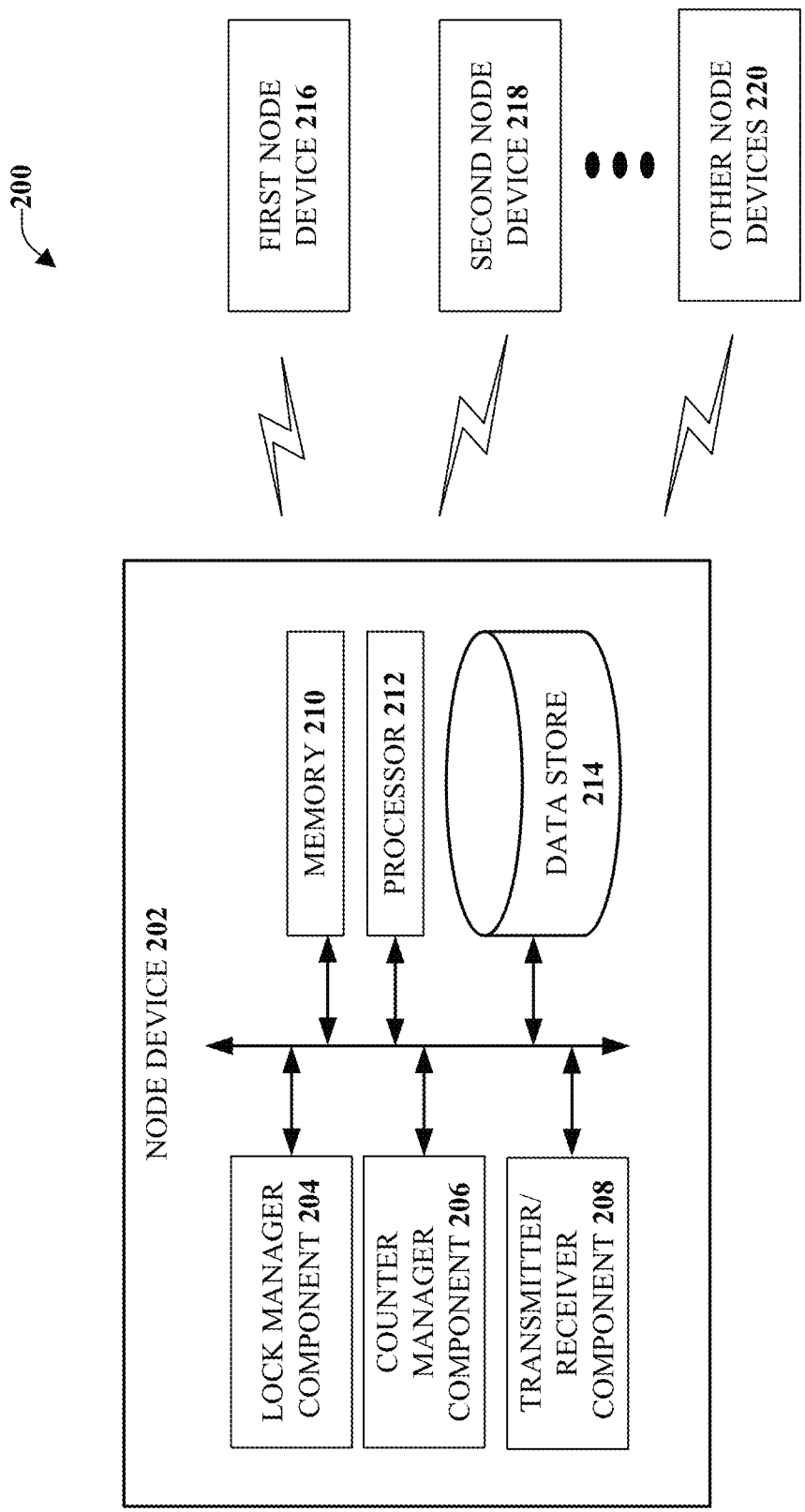
FIG. 2 illustrates an example, non-limiting, system that facilitates implementation of cluster counters on lock value blocks in accordance with one or more embodiments described herein.

In further detail, FIG. 2 illustrates an example, non-limiting, system 200 that facilitates implementation of cluster counters on lock value blocks in accordance with one or more embodiments described herein. Aspects of systems (e.g., the system 200 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 200 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 200 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 200 can include a node device 202, which can be a lock coordinator device of the system 200, which can be, or can be associated with, a distributed file system. The node device 202 can include a lock manager component 204, a counter manager component 206, a transmitter/receiver component 208, at least one memory 210, at least one processor 212, and at least one data store 214. The lock manager component 204 can issue locks and can revoke the locks based on various criteria. For example, locks can be issued for other node devices of the distributed file system to obtain access to resources or objects.

In a cluster file system, there can be a centralized domain lock manager (e.g., the lock coordinator device) that is located in a single node and through which the other nodes have to communicate in order to access resources (e.g., objects, files, and so on). The domain lock manager can include a lock domain. In the lock domain shared resources (e.g., a shared file system) can be associated with a set of "locks" that are used to coordinate access to the resources by the nodes. Accordingly, the lock domain can coordinate access to the resources by the nodes. For example, a "lock domain" can be utilized in order to coordinate access to files (or other resources).

Upon or after a node device requests access to a resource, the lock manager component 204 can issue a lock to that node device and provide a value of a LVB to that node device. Further, upon or after other node devices request access to the resource, the lock manager component 204 can issue locks to those node devices and provide a value of a LVB to those node devices. The locks granted in this situation can be non-exclusive locks that have a compatible lock type. The resources or objects can be, for example, a file stored on a distributed file system or another type of computer readable data stored on the distributed file system. The node device 202 can issue the locks and/or revoke the locks via the transmitter/receiver component 208.

By way of example and not limitation, the lock manager component 204 can issue a lock for a resource to a first node device 216. While the first node device 216 holds the lock, the lock manager component 204 can issue another lock for the same resource to a second node device 218. Further, while the first node device 216 and the second node device 218 hold the lock, the lock manager component 204 can issue one or more other locks for the resource to one or more subsequent node devices 220. It is noted that any other number of node devices can be included in the system 200 according to various embodiments.

An LVB can be associated with each resource (e.g., object, file, and so on). The lock is a mechanism by which the lock coordinator can enforce a mutual exclusive access from multiple agents running in a clustered system. When a lock is granted to a given entity running in the cluster, the value block is a value that travels with that lock that is granted (e.g., that particular granted write of access). Conventionally, when an entity (e.g., a node) has an LVB, such as when the node is awarded the lock, the node is allowed to update that value such that future or other entities that grab the lock also get the updated value.

The various embodiments discussed herein allow a level of shared access of obtaining the last known value of the lock. Nodes that are accessing the resource are able to make simultaneous incremental (or delta) updates traveling in one direction, that increments forward such that when it comes time to obtain a different lock type, it can actually conflict with the locking system itself such that a node requesting the lock does not obtain that lock or that particular type of lock until all other locks are relinquished. The act of relinquishing those other locks, causes those other locks to be merged as discussed herein. This provides a way to implement a flow friction counter in a cluster system.

Continuing the above example of FIG. 1, the node devices (e.g., the first node device 216, the second node device 218, the subsequent node devices 220) can hold their respective locks until the lock manager component 204 transmits a revocation request to those node devices. The revocation request can be in response to another node device requesting exclusive access to the resource.

Upon or after receipt of the revocation request, each node device can send a release message as well as the value of the lock as determined at the node device. For example, the first node device 216 can provide a first set of values, which include a first increment value and a first decrement value. The first set of values indicate the status of the LVB as understood from the perspective of the first node device 216. The second node device 218, which holds a LVB for the same resource as the first node device 216 can provide a second set of values, which include a second increment value and a second decrement value. The second set of values indicate the status of the LVB as understood from the perspective of the second node device 218. The subsequent node devices 220 can hold LVBs for the same resource as the first node device 216 and the second node device 218 and can provide respective subsequent sets of values, which include respective subsequent increment values and respective subsequent decrement values. The respective subsequent sets of values indicate the status of the LVB as understood from the perspective of the respective subsequent node devices 220.

It is noted that the respective increment values (e.g., the first increment value, the second increment value, the third increment value, the respective subsequent increment values) indicate the number of times the LVB was incremented, or a value added to the LVB, at the respective node device. Further, the respective decrement values (e.g., the first decrement value, the second decrement value, the third decrement value, the respective subsequent decrement values) indicate the number of times the LVB was decremented, or a value subtracted from the LVB, at the respective node device.

Upon or after receipt of the lock release message and the respective values from the node devices, the counter manager component 206 can obtain values of the lock as computed by each node device to which the lock was issued. Thus, the counter manager component 206 can receive the first set of values and subtract the first decrement value from the first increment value, resulting in a first difference value. Further, the counter manager component 206 can receive the second set of values and subtract the second decrement value from the second increment value, resulting in a second difference value. As each subsequent set of values is received, the counter manager component 206 can reduce each subsequent decrement value from each subsequent increment value individually, resulting in subsequent difference values. It is noted that although discussed with respect to a particular sequence, the respective sets of values can be received from the node devices in any order, dependent on the timing when each node device releases its lock.

As the respective difference values are determined, the counter manager component 206 can merge the values together. For example, upon or after determining the second difference value as discussed above, the counter manager component 206 can add the first difference value and the second difference value, resulting in a merged difference value. Thereafter, as each subsequent difference value is determined, the counter manager component 206 can add that subsequent difference value to the previous merged difference value, resulting in subsequent updated merged difference values. This process can be repeated until all locks have been released and all values merged. Again, it is noted that the locks can be released and the values determined in any other order, dependent on the timing when each node device releases its lock. As such, a final value of the LVB can be determined as discussed herein.

The at least one memory 210 can be operatively connected to the at least one processor 212. The at least one memory 210 can store executable instructions and/or computer executable components (e.g., the lock manager component 204, the counter manager component 206, the transmitter/receiver component 208, and so on) that, when executed by the at least one processor 212 can facilitate performance of operations (e.g., the operations discussed with respect to the various methods and/or systems discussed herein). Further, the at least one processor 212 can be utilized to execute computer executable components (e.g., the lock manager component 204, the counter manager component 206, the transmitter/receiver component 208, and so on) stored in the at least one memory 210.

For example, the at least one memory 210 can store protocols associated with facilitating the implementation of cluster counters on lock value blocks in distributed file systems as discussed herein. Further, the at least one memory 210 can facilitate action to control communication between the system 200 and other node devices, one or more file storage systems, one or more devices, such that the system 200 employs stored protocols and/or algorithms to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 212 can facilitate respective analysis of information related to implementing cluster counters on lock value blocks. The at least one processor 212 can be a processor dedicated to analyzing and/or generating information received, a processor that controls one or more components of the system 200, and/or a processor that both analyzes and generates information received and controls one or more components of the system 200.

The transmitter/receiver component 208 can receive one or more requests to access resources and/or objects and/or can receive one or more counter values after a lock has been released. Further, the transmitter/receiver component 208 can output respective grants to open the object, write to the object, or perform other functions associated with the object based in response to the requests. The transmitter/receiver component 208 can also output one or more revocation requests. The transmitter/receiver component 208 can be configured to transmit to, and/or receive data from, for example, log files, a defined entity, one or more other nodes, and/or other communication devices. Through the transmitter/receiver component 208, the system 200 can concurrently transmit and receive data, can transmit and receive data at different times, or combinations thereof.

Figure 3:
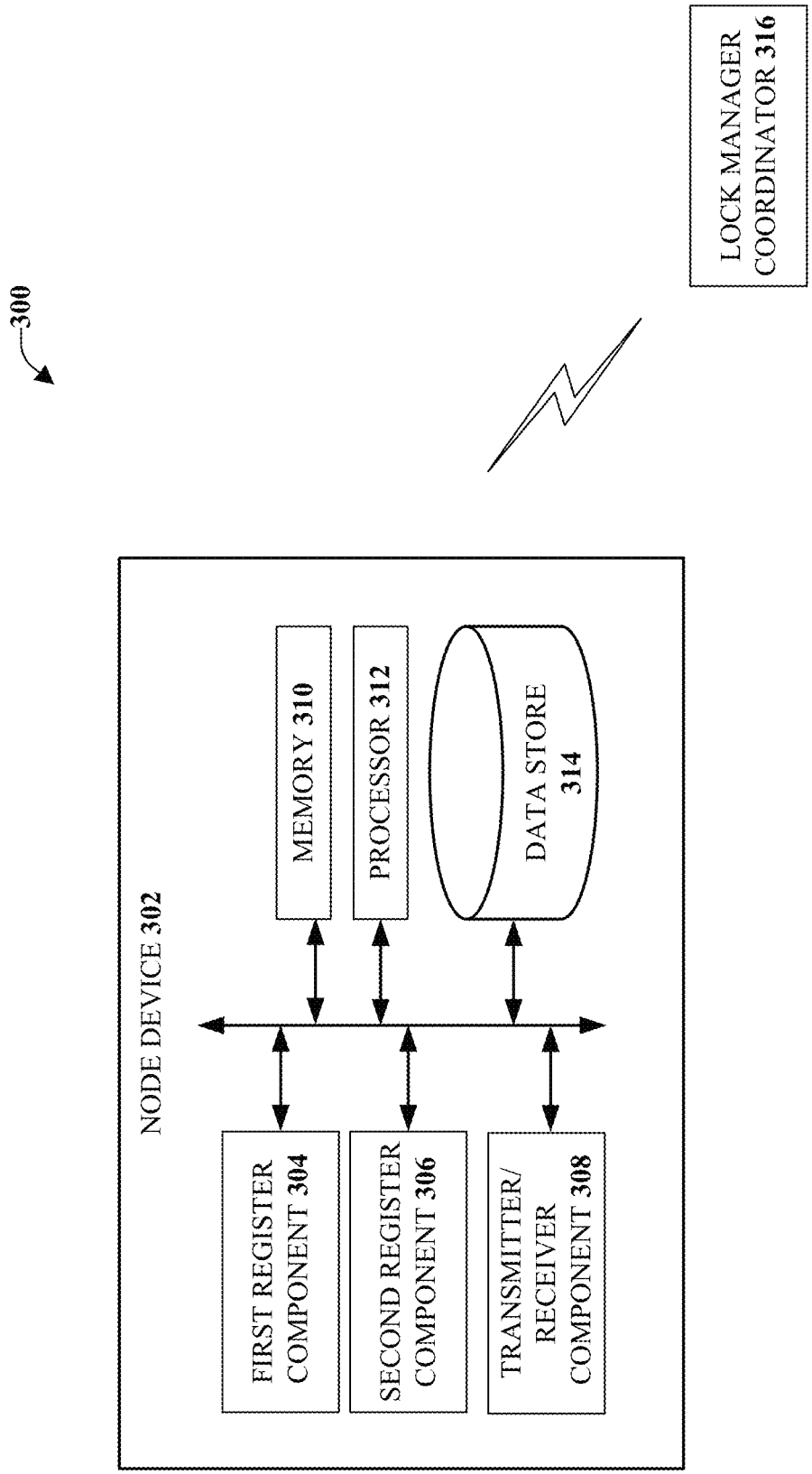
FIG. 3 illustrates an example, non-limiting, system that facilitates independent counting of locks at node devices in accordance with one or more embodiments described herein.

FIG. 3 illustrates an example, non-limiting, system 300 that facilitates independent counting of locks at node devices in accordance with one or more embodiments described herein. The system 300 can comprise one or more of the components and/or functionality of the system of FIG. 2 and vice versa.

The system 300 can include a node device 302, which can be associated with a distributed file system. The node device 302 can include a first register component 304, a second register component 306, a transmitter/receiver component 308, at least one memory 310, at least one processor 312, and at least one data store 314.

Upon or after a lock is issued to the node device 302 by a lock manager coordinator 316 (e.g., the node device 202), the node device 302 can track the value of the LVB from its perspective. Thus, the first register component 304 can increment a value each time the node device 302 determines a value should be added to the LVB. Further, the second register component 306 can increment a value each time the node device 302 determines a value should be subtracted from the LVB.

According to conventional systems, when a node device obtains an LVB, the node device gets a lock that comes with a value. It optionally comes with a value that may be defined or might not be defined. That value is usually used as a cache invalidation mechanism. If the value that the node device has in its cache, when it obtains the LVB, is different than the value that came with the LVB, the node device knows that its cache is stale and it has to throw away the cache and revalidate it. The LVBs are typically used for a single integer and only one thing at a time can ever update it because one thing at a time is invalidating the cache and all the other node devices have to react to that.

As discussed herein, the various embodiments uses similar primitives and combines a couple of different primitives from a few different domains (in the computer science knowledge sense). Thus, the same primitives can be used but to create a parallel semaphore. Such as how many things are out there in global are in parallel with nodes simultaneously incrementing and decrementing the values. It is noted that LVBs can only be incrementing so decrementing is not used with conventional systems. The disclosed embodiments are capable of decrementing the LVBs. Thus, there can be a restriction on the operations of the LVBs, which are mathematically communitive.

To provide the decrement function, instead of keeping one integer, each node device keeps two integers (facilitated by the first register component 304 and the second register component 306). Both register components increment, where the first register component 304 increments the number of times it incremented the value and the second register component 306 increments the number of time it decremented the value. By using these two values, the lock manager coordinator 316 (e.g., the counter manager component 206) performs a merge operation so that the node device can use a shared exclusive lock, as discussed herein.

The increments and decrements on the shared exclusive locks and the merge function can allow for parallelism of the values.

The value can represent, for example, the number of items placed in a queue and the number of times the items in the queue are moved. Thus, the items have to be counted up and counted down. Another example, non-limiting use is for statistic counters. As another example, there is a concept of trying to put limits on the number of outstanding operations being used in the cluster. To do this, a not too strict, but within reason, high performance manner of putting a limit on outstanding operations is provided that is able to indicate that the limit of outstanding operations is reached. Thus, the increment value can be increased until the limit is reached. Further, when those operations are finished (they are no longer outstanding, they are completed), the value can be decremented to make room for more operations to be issued.

With continuing reference to FIG. 3, the at least one memory 310 can be operatively connected to the at least one processor 312. The at least one memory 310 can store executable instructions and/or computer executable components (e.g., the first register component 304, the second register component 306, the transmitter/receiver component 308, and so on) that, when executed by the at least one processor 312 can facilitate performance of operations (e.g., the operations discussed with respect to the various methods and/or systems discussed herein). Further, the at least one processor 312 can be utilized to execute computer executable components (e.g., the first register component 304, the second register component 306, the transmitter/receiver component 308, and so on) stored in the at least one memory 310.

For example, the at least one memory 310 can store protocols associated with facilitating the implementation of cluster counters on lock value blocks in distributed file systems as discussed herein. Further, the at least one memory 310 can facilitate action to control communication between the system 300 and other node devices, one or more file storage systems, one or more devices, such that the system 300 can employ stored protocols and/or algorithms to achieve improved overall performance of distributed file systems as described herein.

The at least one processor 312 can facilitate respective analysis of information related to implementing cluster counters on lock value blocks, tracking increments, and tracking decrements. For example, the at least one processor 312 can track a value of the lock represented as an increment value and a decrement value. The at least one processor 312 can be a processor dedicated to analyzing and/or generating information received, a processor that controls one or more components of the system 300, and/or a processor that both analyzes and generates information received and controls one or more components of the system 300.

The transmitter/receiver component 308 can receive a non-exclusive lock and receive a revocation request for the lock. Further, the transmitter/receiver component 308 can output a lock release message, an increment value, and a decrement value associated with the lock. The transmitter/receiver component 308 can be configured to transmit to, and/or receive data from, for example, log files, a defined entity, one or more other nodes, and/or other communication devices. Through the transmitter/receiver component 308, the system 300 can concurrently transmit and receive data, can transmit and receive data at different times, or combinations thereof.

Figure 4:
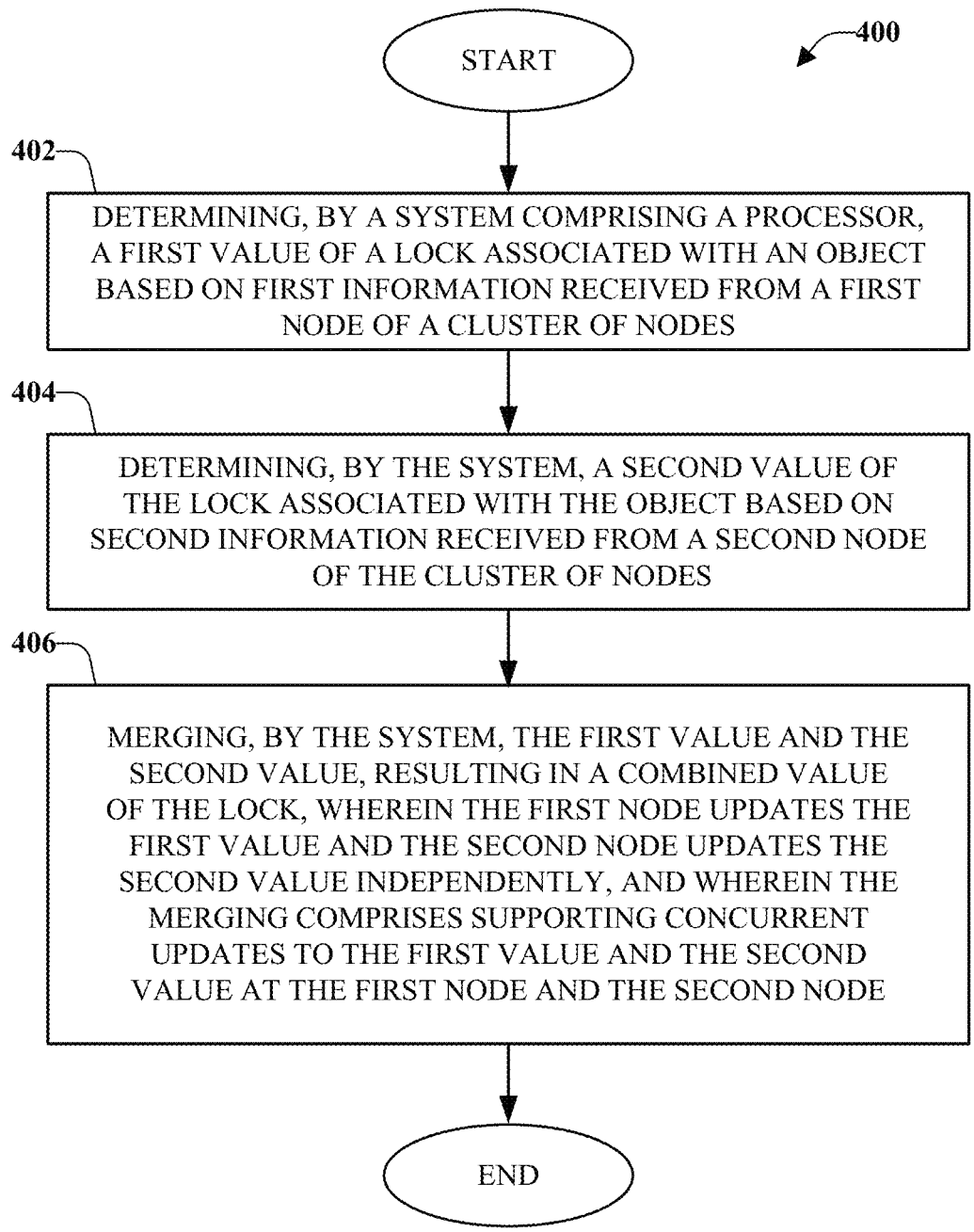
FIG. 4 illustrates a flow diagram of an example, non-limiting, computer-implemented method that implements an exclusive local lock over a defined lock in accordance with one or more embodiments described herein.

FIG. 4 illustrates a flow diagram of an example, non-limiting, computer-implemented method 400 that implements an exclusive local lock over a defined lock in accordance with one or more embodiments described herein. The computer-implemented method 400 and/or other methods discussed herein can be implemented by a system comprising a processor and a memory. In an example, the system can be implemented by a node device.

The computer-implemented method 400 starts at 402 when a first value of a lock associated with an object can be determined based on first information received from a first node of a cluster of nodes (e.g., via the counter manager component 206). Further, at 404, a second value of the lock associated with the object can be determined based on second information received from a second node of the cluster of nodes (e.g., via the counter manager component 206).

By way of example and not limitation, the first information can include two values. For example, a first value can be a number of times that the value of the lock was incremented and the second value can be the number of times that the value of the lock was decremented. In the case of computing operations, the first value can be incremented each time a request for a computing operation is requested, by the first node, to be performed and the second value can be incremented each time a requested computing operation is completed for the first node. The second information can include similar values for the second node.

The computer-implemented method 400 continues, at 406, when the first value and the second value are merged (e.g., via the counter manager component 206). The merging of the first value and the second value results in a combined value of the lock. It is noted that the first node updates the first value and the second node updates the second value independently of one another. Further, merging the first value and the second value can include supporting concurrent (or substantially concurrent) updates to the first value and the second value at the first node and the second node. Thus, the first node can be updating its respective values and the second node can be updating its respective values without being aware of what the other node is doing.

A conventional way to implement distributed counters needs exclusivity to either read or write the new values. For example, one could store a counter's value in a file on a shared file system. Updates and reads of this file must be preceded by the appropriate lock taken. Thus, both need the overhead and the lock system and data storage routines to maintain the lock status.

As discussed herein, non-exclusive locks are granted and the values are summed and merged to increase processing performance of the entire cluster. If exclusive locks are needed each time a value is to be changed, it would slow down the performance of the entire cluster. Accordingly, as discussed herein, multiple nodes can cooperatively share a computation without locking each other out. Accordingly, a higher performance counting system can be achieved.

Figure 5:
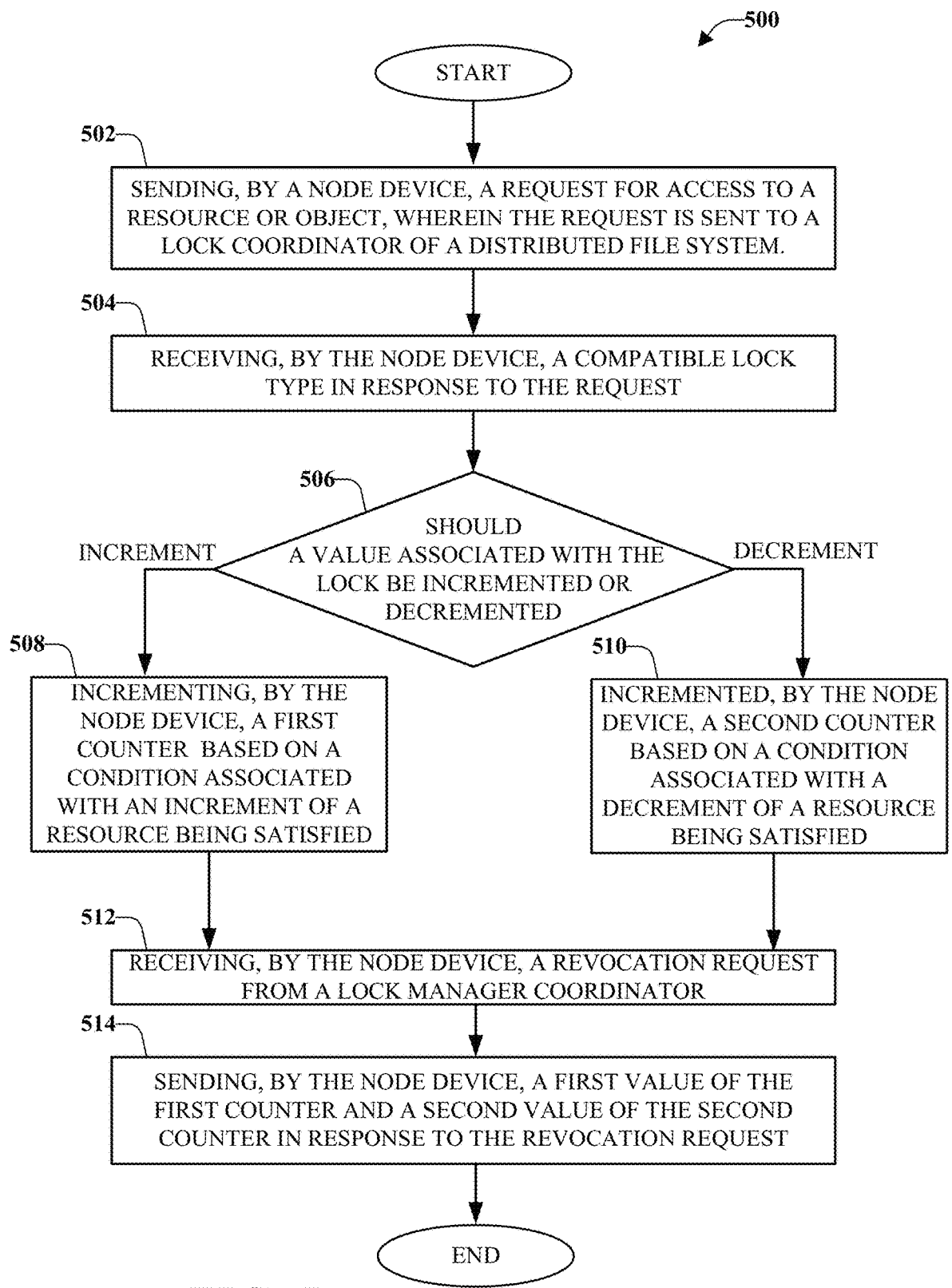
FIG. 5 illustrates a flow diagram of an example, non-limiting, computer-implemented method that tracks local values of a lock at a node device in accordance with one or more embodiments described herein.

FIG. 5 illustrates a flow diagram of an example, non-limiting, computer-implemented method 500 that tracks local values of a lock at a node device in accordance with one or more embodiments described herein. The computer-implemented method 500 and/or other methods discussed herein can be implemented by a system comprising a processor and a memory. In an example, the system can be implemented by a node device.

The node device can send a request for access to a resource or object, at 502 of the computer-implemented method 500 (e.g., via the transmitter/receiver component 308). For example, the request can be sent to a lock manager coordinator (e.g., the lock manager coordinator 318). The lock manager coordinator can grant a lock to the node device 502, which can be received, at 504 (e.g., via the transmitter/receiver component 308). The lock can be a compatible-type lock as discussed herein. Upon or after receiving the lock, count ups and count downs of the lock can be tracked (e.g., via the first register component 304 and the second register component 306).

For example, at 506, a determination can be made whether a value associated with the lock should be incremented or decremented. For example, in the case of outstanding operations it can be determined that the value should be incremented when a request for an operation to be performed is issued. Further, it can be determined that the value should be decremented when the operation is finished.

Upon or after it is determined the value should be incremented, at 508, a first counter can be incremented based on a condition associated with an increment of a resource being satisfied (e.g., a request for an operation to be performed is issued). Upon or after it is determined the value should be decremented, at 510, a second counter can be incremented based on a condition associated with a decrement of the resource being satisfied (e.g., an operation has been completed).

At 512, a revocation request can be received from a lock manager coordinator (e.g., via the transmitter/receiver component 308). The revocation request can be received based on another node device requesting an exclusive lock for the resource. At 514, a response to the revocation request can be sent to the lock manager coordinator (e.g., via the transmitter/receiver component 308). The response can include a lock release message, a first value of the first counter, and a second value of the second counter.

By way of example and not-limitation, the revocation request can be based on a determination that load balancing should be performed within the distributed file system. For example, there might be a need to distribute operations around a cluster because node 4 has more need of operations than does node 3. Therefore, support operations can be taken from node 3 and given to node 4. Accordingly, an exclusive lock will be taken in order to perform the distribution of operations, which can be achieved by actually knowing how many operations are in flight at this instant.

Figure 6:
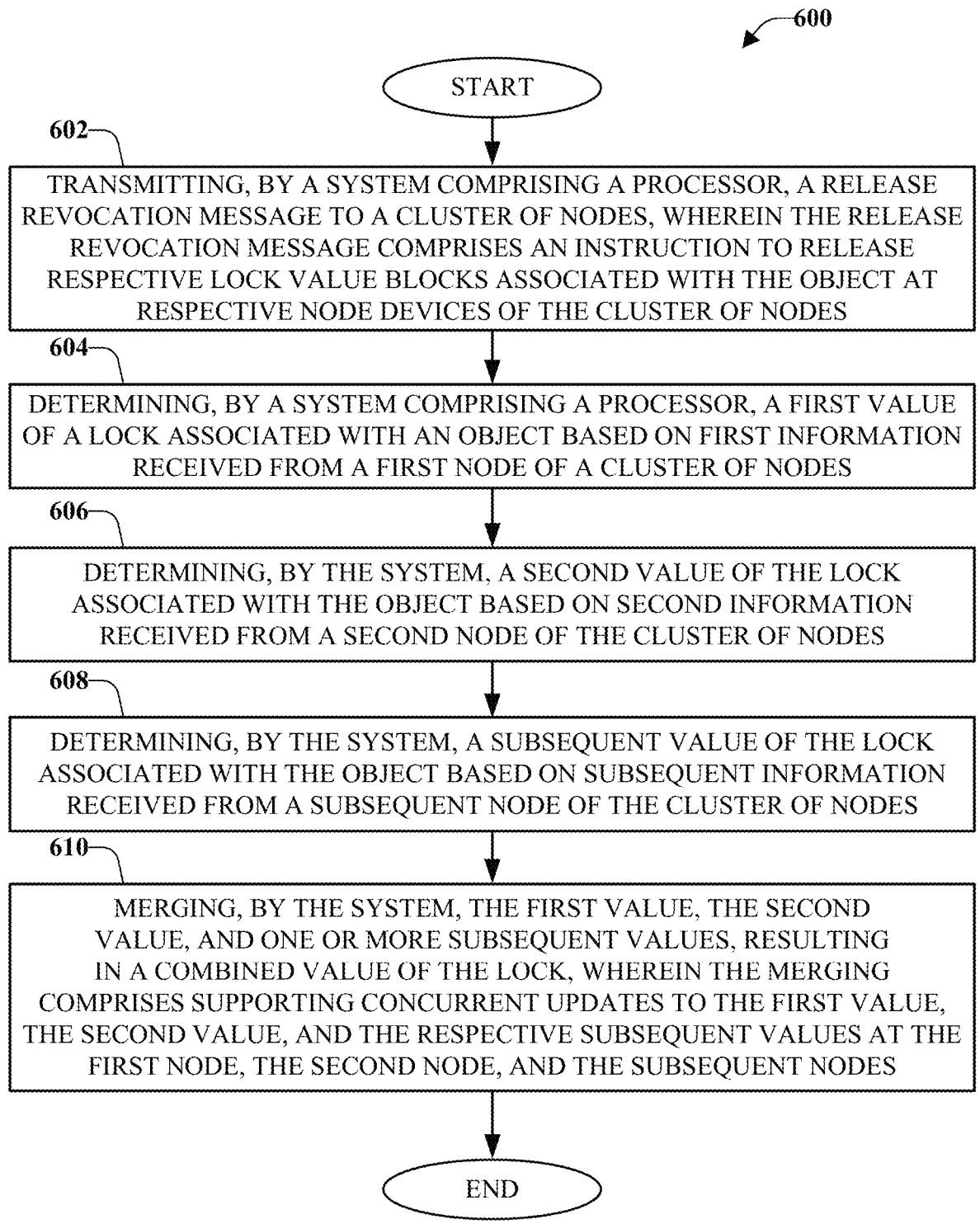
FIG. 6 illustrates a flow diagram of an example, non-limiting, computer-implemented method that implements cluster counters on lock value blocks in accordance with one or more embodiments described herein.

FIG. 6 illustrates a flow diagram of an example, non-limiting, computer-implemented method 600 that implements cluster counters on lock value blocks in accordance with one or more embodiments described herein. The computer-implemented method 600 and/or other methods discussed herein can be implemented by a system comprising a processor and a memory. In an example, the system can be implemented by a node device.

At 602 of the computer-implemented method 600, a release revocation message is transmitted to a cluster of nodes. The release revocation message can include an instruction to release respective lock value blocks associated with the object at respective node devices of the cluster of nodes. The object can be a file stored on a distributed file system, for example. Further, the nodes of the cluster of nodes can be part of a distributed file system.

A first value of a lock value block associated with the object can be determined, at 604, based on first information received from a first node of the cluster of nodes. The first information can include a first increment value and a first decrement value. To determine the first value, the first increment value can be reduced by the first decrement value (e.g., the first decrement value is subtracted from the first increment value).

At 606, a second value of the lock associated with the object can be determined based on second information received from a second node of the cluster of nodes. The second information can include a second increment value and a second decrement value. To determine the second value, the second increment value can be reduced by the second decrement value (e.g., subtract the second decrement value from the second increment value).

Further, at 608, a subsequent value (e.g., a third value, a fourth value, and so on) of the lock associated with the object can be determined based on subsequent information (e.g., a third value, a fourth value, and so on) received from a subsequent node (e.g., a third node, a fourth node, and so on) of the cluster of nodes. The subsequent information can include a subsequent increment value (e.g., a third increment value, a fourth increment value, and so on) and a subsequent decrement value (e.g., a third decrement value, a fourth decrement value, and so on). To determine the subsequent value, the subsequent increment value can be reduced by the subsequent decrement value (e.g., subtract the subsequent decrement value from the subsequent increment value).

At 610, the first value, the second value, and the one or more subsequent values are merged, resulting in a combined value of the lock. The first node updates the first value, the second node updates the second value, and the subsequent nodes update the respective subsequent values independently. Further, merging the values comprises supporting concurrent updates to the first value, the second value, and the respective subsequent values at the first node, the second node, and the subsequent nodes. For example, the merging can include determining a summation of the first value, the second value, and the respective subsequent values. For example, the first value, the second value, and the respective subsequent values can be added together. According to some implementations, the merging can be performed by a lock coordinator node of the group of node devices.

Figure 7:
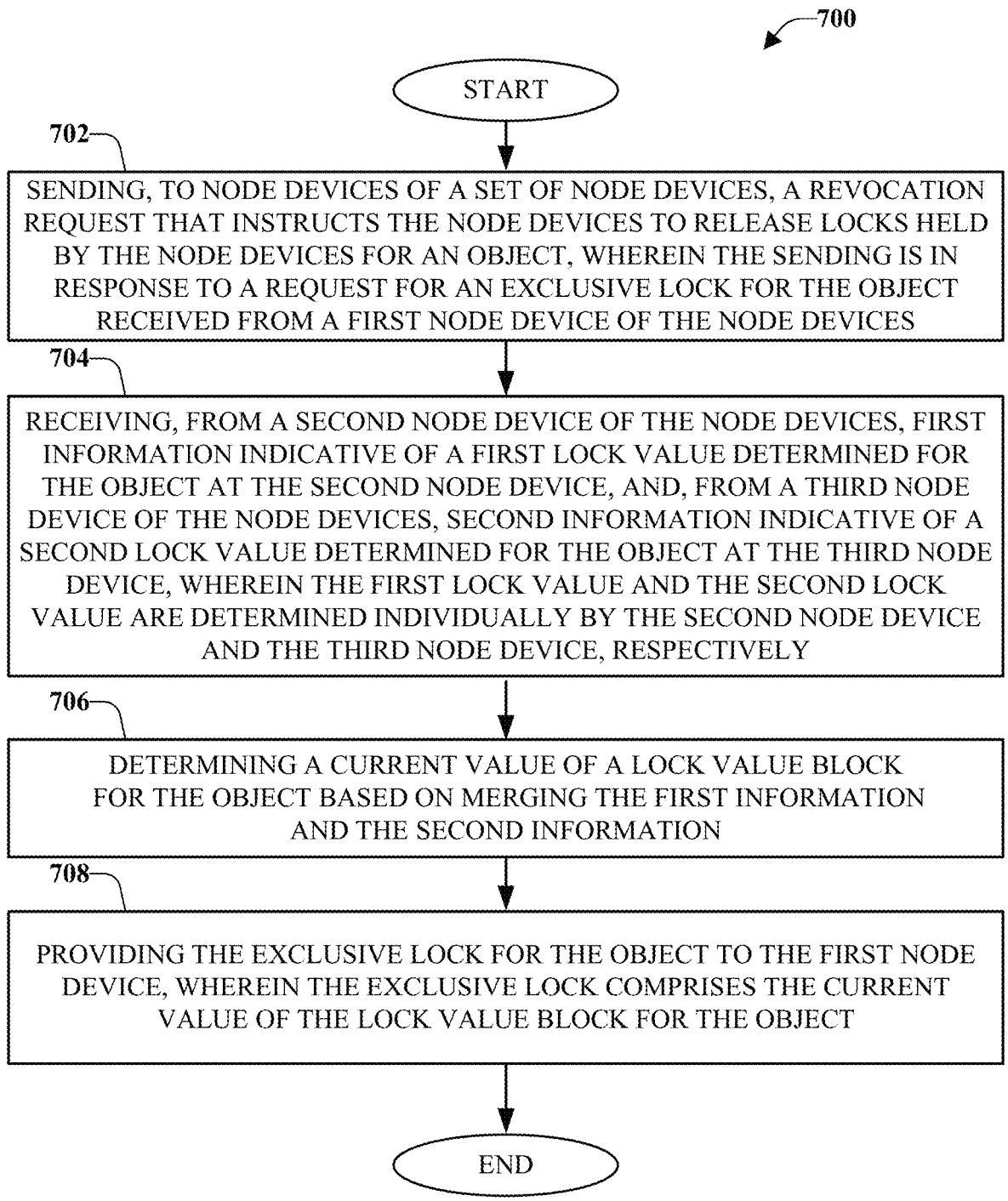
FIG. 7 illustrates a flow diagram of an example, non-limiting, computer-implemented method for merging different values of a lock as tracked by different node devices of a group of node devices in accordance with one or more embodiments described herein.

FIG. 7 illustrates a flow diagram of an example, non-limiting, computer-implemented method 700 for merging different values of a lock as tracked by different node devices of a group of node devices in accordance with one or more embodiments described herein. The computer-implemented method 700 and/or other methods discussed herein can be implemented by a system comprising a processor and a memory. In an example, the system can be implemented by a node device.

As discussed, individual threads across different nodes can take a lock simultaneously or substantially simultaneously. For example, a first thread of a first node device and a second thread of a second node device can obtain respective locks for the object simultaneously or substantially simultaneously. For example, a first thread of the first node device can obtain a first lock for the object and the second thread of the second node device can obtain a second lock for the object, while the first node device continues to hold the first lock. Accordingly, although the receipt of the lock at the respective node devices does not need to occur at a same time, additional node devices can obtain and hold respective locks while other node devices continue to hold their respective locks. Further, it is noted that the ownership of a lock is retained at a node level. The first thread and the second thread (or subsequent threads of subsequent node devices) do not have the ownership of the lock (e.g., the threads are not assigned the lock, or are not permitted to have the lock).

The different nodes can individually update their respective lock values, which can eventually be merged back to a lock coordinator, rather than copying over the prior value.

The computer-implemented method 700 starts at 702 when a revocation request is sent to node devices of a set of node devices. The revocation request instructs the node devices to release locks held by the node devices for an object. The revocation request can be sent in response to a request for an exclusive lock for the object received from a first node device of the node devices.

At 704, first information indicative of a first lock value determined for the object at a second node device is received from the second node device of the node devices. Further, at 706, second information indicative of a second lock value determined for the object at a third node device can be received from the third node device.

The first information can include a first increment value of the object and a first decrement value of the object. The second information can include a second increment value of the object and a second decrement value of the object.

In some implementations, other node devices (e.g., subsequent node devices) can sent subsequent information in response to the revocation request. The number of node devices that send information is dependent on the number of node devices that received a compatible lock type as discussed herein. The first lock value, the second lock value, and any subsequent lock values are determined individually by the second node device, the third node device, and subsequent node devices, respectively.

A current value of a lock value block for the object can be determined, at 706, based on merging the first information, the second information, and the subsequent information. For example, determining the current value can include determining a first status value based on subtracting the first decrement value from the first increment value. Further, a second status value can be determined based on subtracting the second decrement value from the second increment value. Additionally, an aggregation of the first status value and the second status value can be determined, resulting in the current value of the lock value block for the object.

Upon or after all node devices have released their respective locks, in response to the revocation request, at 708, the exclusive lock for the object can be provided to the first node device. The exclusive lock comprises the current value of the lock value block for the object.

Figure 8:
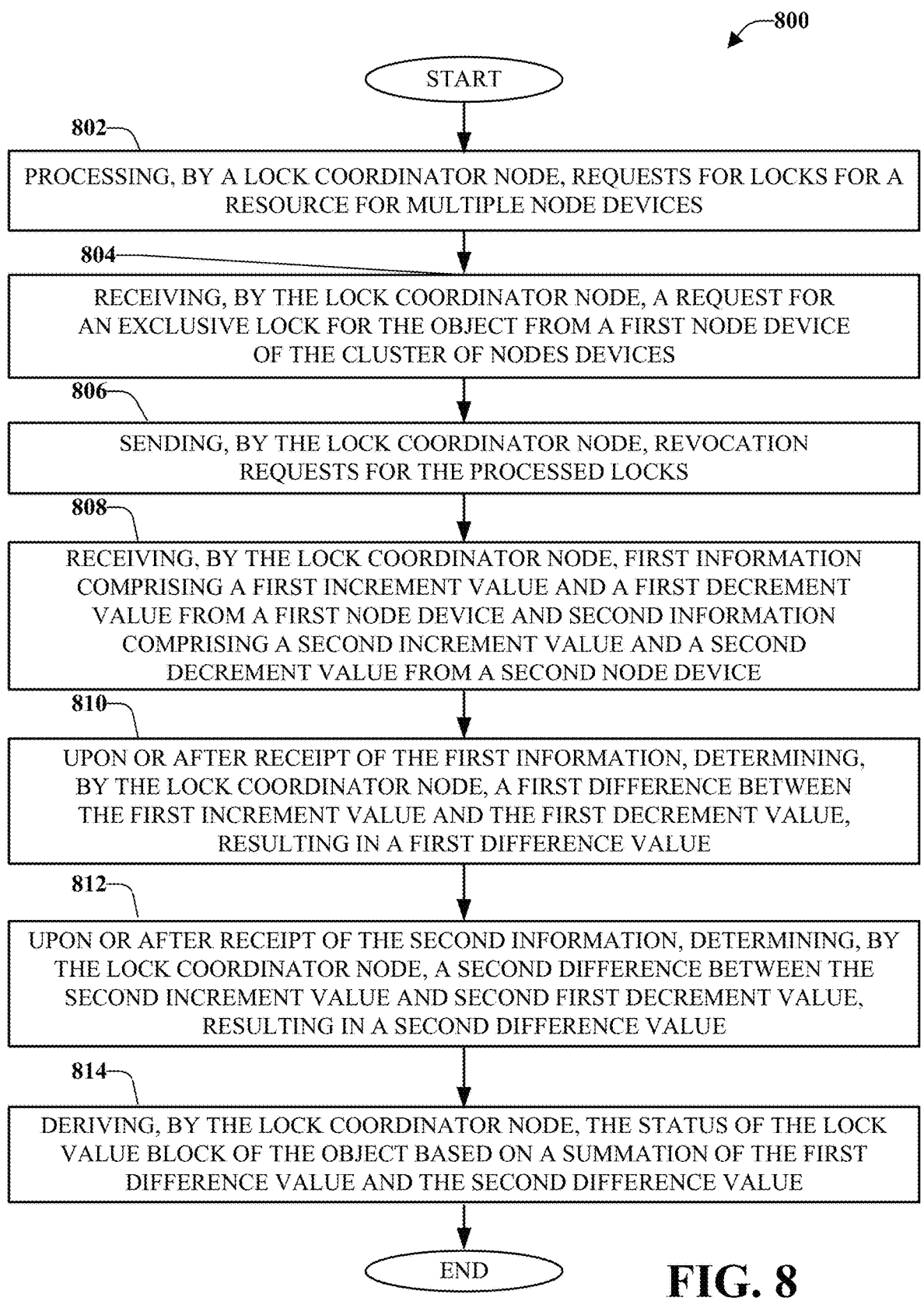
FIG. 8 illustrates a flow diagram of an example, non-limiting, computer-implemented method for merging different values of a lock associated with a resource based on a request for an exclusive lock for the resource in accordance with one or more embodiments described herein.

FIG. 8 illustrates a flow diagram of an example, non-limiting, computer-implemented method 800 for merging different values of a lock associated with a resource based on a request for an exclusive lock for the resource in accordance with one or more embodiments described herein. The computer-implemented method 800 and/or other methods discussed herein can be implemented by a system comprising a processor and a memory. In an example, the system can be implemented by a node device.

At 802 of the computer-implemented method 800, requests for locks for a resource can be processed for multiple node devices of a cluster of node devices. The locks can have a compatible lock type whereby individual threads across different nodes (e.g., the multiple node devices) can take a lock (or hold a lock) simultaneously, update their local values, and the local values can be merged at a lock coordinator as discussed herein.

A request for an exclusive lock for the object is received from a first node device of the cluster of node devices, at 804. Upon or after the request is received, at 806, revocation requests can be sent revoking the locks for the resource. In response to the revocation requests, at 810, first information is received from a first node device and second information is received from a second node device (further other information from other node devices can also be received). The first information can be indicative of a first lock value block status of an object and the second information can be indicative of a second lock value block status of the object. According to some implementations, the first information and a first lock release indication can be received from the first node device and the second information and a second lock release indication can be received from the second node device.

In some implementations, the first information can include a first increment value of the lock value block and a first decrement value of the lock value block determined by the first node device. Further, the second information can include a second increment value of the lock value block and a second decrement value of the lock value block determined by the second node device.

Upon or after receipt of the first information, at 810, a first difference between the first increment value and the first decrement value is determined, resulting in a first difference value. Further, upon or after receipt of the second information, at 812, a second difference between the second increment value and the second decrement value is determined, resulting in a second difference value. At 814 of the computer-implemented method 800, a status of the lock value block of the object is derived based on a summation of the first difference value and the second difference value.

According to an example, non-limiting, implementation, the lock value block implemented at the respective node devices of the group of node devices can be associated with pending computing processes executing on the group of node devices. Thus, the status of the lock value block can be compared with a threshold status level. Based on the status of the lock value block satisfying the threshold status level, the pending computing processes executing on a third node device of the group of node devices can be temporarily halted. Further, based on the status of the lock value block failing to satisfy the threshold status level, the pending computing processes executing on the third node device can be approved.

It is noted that conventional systems do not have a merge function, but an overwrite function. As discussed herein, provided is an intelligent merge function that splits apart two integers (e.g., the first value and the second value), performs a sum on the set, and merges the sum with other sets. Thus, according to the disclosed embodiments, outstanding lock holder value blocks are collected into a list and the numbers in the list are summed together. This can be performed one at a time as the releases are being processed. The release message, or the release revocation, can be transmitted to all the nodes, which send back their lock along with their current understanding of the LVB. As each is processed, their counters are added to the last version (e.g., accumulate a sum over that resource). Once all nodes have released their locks, the value has been updated for free by doing that processing on a per release message basis. Previously, the LVB was overwriting the old value, however, as discussed herein the values are summed together. This is performed continually until all locks are released. Once they are all released a sum total is determined. Accordingly, provided is a novel way of doing the local counter values updates inexpensively, deferring the cost of gathering the consistent value "on demand" by taking the more exclusive lock.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
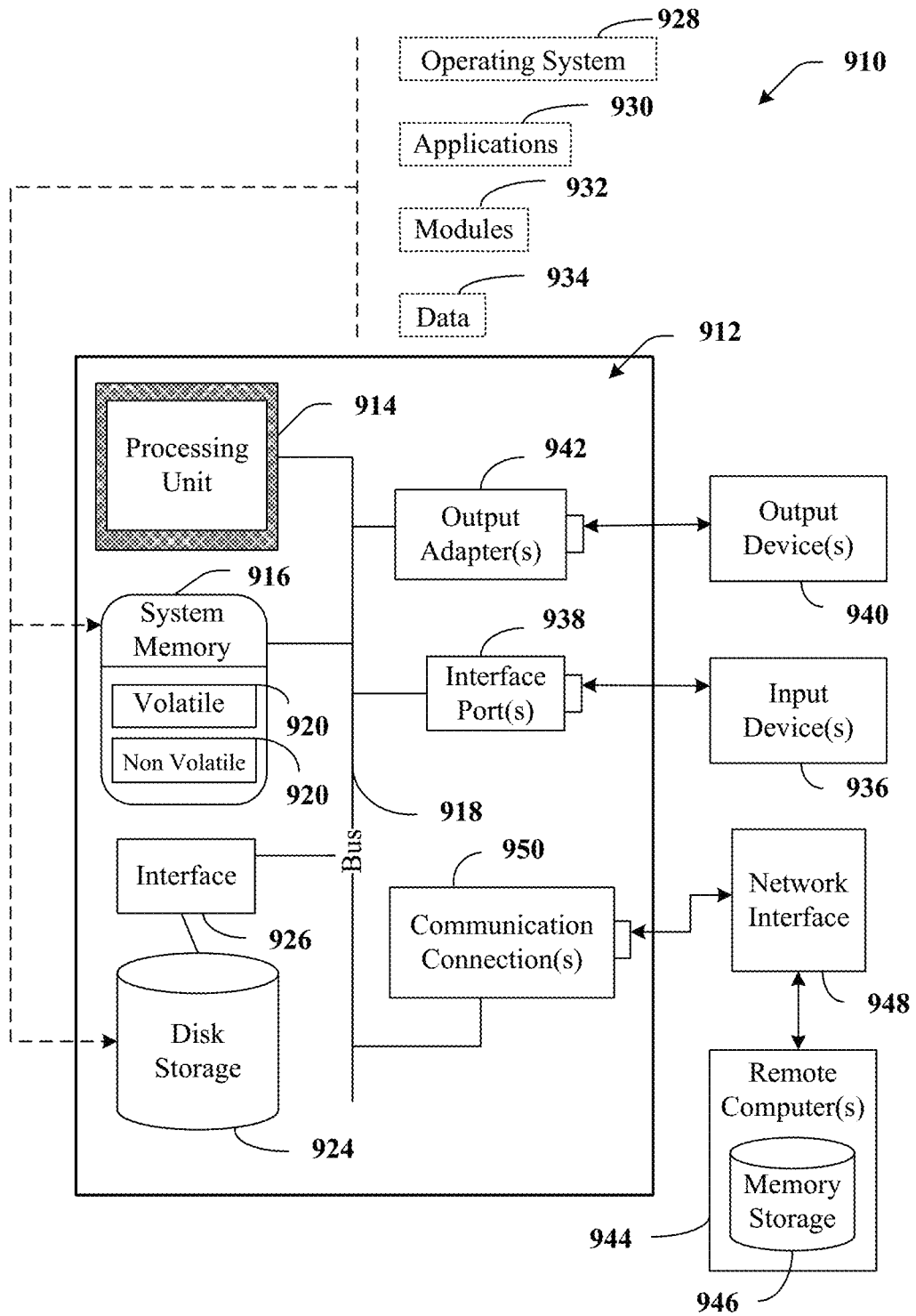
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
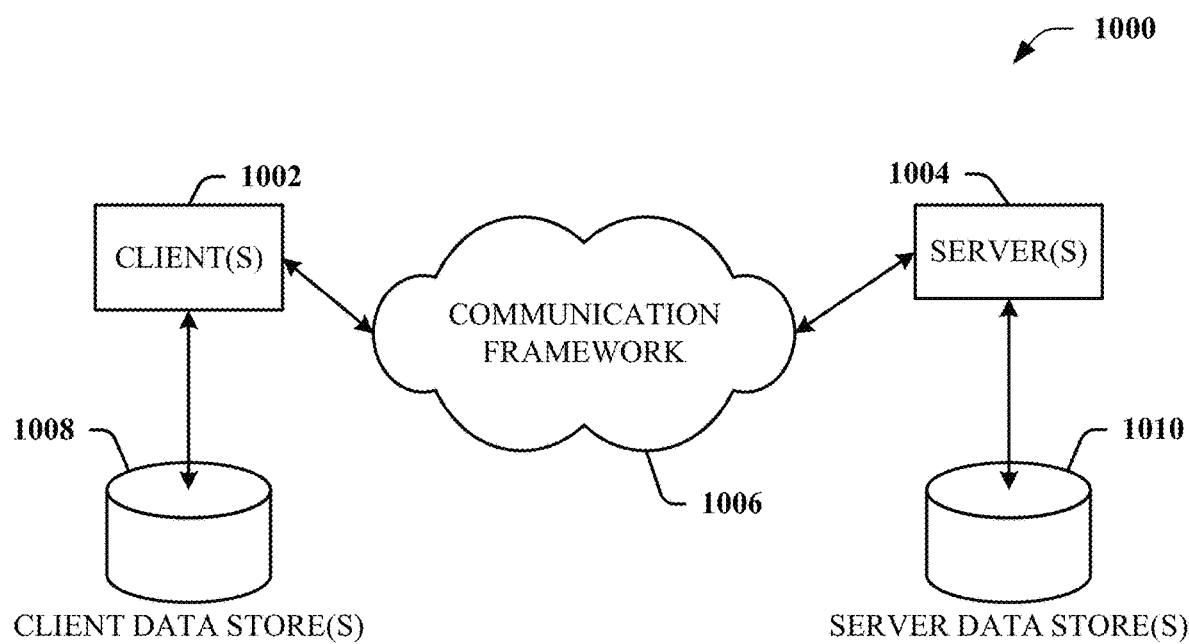
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor; and
  a memory that stores executable instructions that, when executed by the processor, facilitate performance of operations, comprising:
    receiving, from a first node device of a group of node devices, first information indicative of a first lock value block status of an object, and, from a second node device of the group of node devices, second information indicative of a second lock value block status of the object; and
    merging the first information and the second information, resulting in a status of a lock value block of the object implemented at respective node devices of the group of node devices.

2. The system of claim 1, wherein the operations further comprise:
  prior to the receiving of the first information and the second information, transmitting a release revocation message to the group of node devices, wherein the release revocation message comprises an instruction to release the lock value block.

3. The system of claim 2, wherein the operations further comprise:
  in response to the release revocation message, receiving, from the first node device, the first information and a first lock release indication; and
  receiving, from the second node device, the second information and a second lock release indication.

4. The system of claim 1, wherein the first information comprises a first increment value of the lock value block and a first decrement value of the lock value block determined by the first node device, and wherein the second information comprises a second increment value of the lock value block and a second decrement value of the lock value block determined by the second node device.

5. The system of claim 4, wherein the merging comprises:
  determining a first difference between the first increment value and the first decrement value, resulting in a first difference value;
  determining a second difference between the second increment value and the second decrement value, resulting in a second difference value; and
  deriving the status of the lock value block of the object based on a summation of the first difference value and the second difference value.

6. The system of claim 1, wherein the lock value block implemented at the respective node devices of the group of node devices is associated with pending computing processes executing on the group of node devices, and wherein the operations further comprise:
  comparing the status of the lock value block with a threshold status level;
  based on the status of the lock value block satisfying the threshold status level, temporarily halting the pending computing processes executing on a third node device of the group of node devices; and
  based on the status of the lock value block failing to satisfy the threshold status level, approving the pending computing processes executing on the third node device.

7. The system of claim 1, wherein a first thread of the first node device and a second thread of the second node device obtain respective locks for the object simultaneously or substantially simultaneously.

8. The system of claim 7, wherein ownership of a lock is retained at a node level, and wherein the first thread and the second thread do not have the ownership of the lock.

9. The system of claim 1, wherein the object is a file stored on a distributed file system.

10. The system of claim 1, wherein nodes of a distributed file system comprise the group of node devices.

11. A method, comprising:
  determining, by a system comprising a processor, a first value of a lock associated with an object based on first information received from a first node of a cluster of nodes;
  determining, by the system, a second value of the lock associated with the object based on second information received from a second node of the cluster of nodes; and
  merging, by the system, the first value and the second value, resulting in a combined value of the lock, wherein the first node updates the first value and the second node updates the second value independently, and wherein the merging comprises supporting concurrent updates to the first value and the second value at the first node and the second node.

12. The method of claim 11, further comprising:
  determining, by the system, a third value of the lock associated with the object based on third information received from a third node of the cluster of nodes; and
  merging, by the system, the third value with the combined value of the lock, resulting in an updated combined value, wherein the third node updates the first value independently of the first node and the second node, and wherein the merging of the third value comprises supporting concurrent updates to the first value, the second value, and the third value.

13. The method of claim 11, wherein the merging of the first value and the second value is performed by a lock coordinator node of the cluster of nodes.

14. The method of claim 11, wherein the first information comprises a first increment value and a first decrement value, wherein the determining of the first value comprises reducing the first increment value by the first decrement value, wherein the second information comprises a second increment value and a second decrement value, wherein the determining of the second value comprises reducing the second increment value by the second decrement value, and wherein the merging comprises determining a summation of the first value and the second value.

15. The method of claim 11, further comprising:
  prior to the determining of the first value, transmitting a release revocation message to the cluster of nodes, wherein the release revocation message comprises an instruction to release respective lock value blocks associated with the object at respective node devices of the cluster of nodes.

16. The method of claim 11, wherein the object is a file stored on a distributed file system.

17. The method of claim 11, wherein the nodes of the cluster of nodes are part of a distributed file system.

18. A non-transitory machine-readable medium, comprising executable instructions that, when executed by a processor, facilitate performance of operations, comprising:
  sending, to node devices of a set of node devices, a revocation request that instructs the node devices to release locks held by the node devices for an object, wherein the sending is in response to a request for an exclusive lock for the object received from a first node device of the node devices;
  receiving, from a second node device of the node devices, first information indicative of a first lock value determined for the object at the second node device, and, from a third node device of the node devices, second information indicative of a second lock value determined for the object at the third node device, wherein the first lock value and the second lock value are determined individually by the second node device and the third node device, respectively;
  determining a current value of a lock value block for the object based on merging the first information and the second information; and
  providing the exclusive lock for the object to the first node device, wherein the exclusive lock comprises the current value of the lock value block for the object.

19. The non-transitory machine-readable medium of claim 18, wherein the first information comprises a first increment value of the object and a first decrement value of the object, and wherein the second information comprises a second increment value of the object and a second decrement value of the object.

20. The non-transitory machine-readable medium of claim 19, wherein the determining of the current value comprises:
  determining a first status value based on subtracting the first decrement value from the first increment value;
  determining a second status value based on subtracting the second decrement value from the second increment value; and determining an aggregation of the first status value and the second status value, resulting in the current value of the lock value block for the object.

\* \* \* \* \*